(12) United States Patent
Hagberg

(10) Patent No.: US 9,127,767 B2
(45) Date of Patent: Sep. 8, 2015

(54) DEVICE FOR THE AUTOMATIC OPERATION OF A MANUAL GEAR BOX

(75) Inventor: Magnus Hagberg, Södertälje (SE)

(73) Assignee: SCANIA CV AB (SE)

( * ) Notice: Subject to any disclaimer, the term of this patent is extended or adjusted under 35 U.S.C. 154(b) by 430 days.

(21) Appl. No.: 13/378,104

(22) PCT Filed: Jun. 14, 2010

(86) PCT No.: PCT/SE2010/050664
§ 371 (c)(1),
(2), (4) Date: Dec. 14, 2011

(87) PCT Pub. No.: WO2010/147543
PCT Pub. Date: Dec. 23, 2010

(65) Prior Publication Data
US 2012/0090421 A1  Apr. 19, 2012

(30) Foreign Application Priority Data

Jun. 17, 2009  (SE) ...................... 0950469

(51) Int. Cl.
*F16H 63/08*  (2006.01)
*F16H 61/32*  (2006.01)
(Continued)

(52) U.S. Cl.
CPC ............... *F16H 61/32* (2013.01); *F16H 63/20* (2013.01); *F16H 63/3009* (2013.01); *F16H 2063/208* (2013.01); *Y10T 74/2003* (2015.01); *Y10T 74/20177* (2015.01)

(58) Field of Classification Search
CPC ....... F16H 61/32; F16H 61/688; F16H 61/12; F16H 61/30; F16H 63/18; F16H 63/30; F16H 63/20; F16H 63/38; F16H 63/206

USPC ................ 74/335, 337, 337.5, 473.1, 473.12, 74/473.18, 473.21, 473.24, 473.25, 74/473.36, 473.37
See application file for complete search history.

(56) References Cited

U.S. PATENT DOCUMENTS 2,922,315 A  1/1960  Primeau
3,242,759 A  3/1966  Magg
(Continued)

FOREIGN PATENT DOCUMENTS

DE  1480679  9/1969
DE  3136923 C1  1/1983
(Continued)

OTHER PUBLICATIONS

Korean Office Action, dated Jul. 2, 2013, issued in corresponding Korean Patent Application No. 10-2011-7030105. English translation. Total 9 pages.
(Continued)

*Primary Examiner* — William Kelleher
*Assistant Examiner* — Terrence Boes
(74) *Attorney, Agent, or Firm* — Ostrolenk Faber LLP

(57) ABSTRACT

An operating device for an automatically switched manual gearbox. The gearbox has a movable engagement element for each gear. The device has rotary shafts (1) and rotatable shift fingers (2, 3, 4) to move selected engagement elements each for a gear. Each separate shift finger (2, 3, 4) is associated with a specific engagement element. Each shaft finger (2, 3, 4) is separately pivotable independently of the other shift fingers (2, 3, 4). An axially shiftable slide has a connector to each of the fingers at respective axially shifted positions of the slide.

5 Claims, 5 Drawing Sheets

(51) Int. Cl.
*F16H 63/20* (2006.01)
*F16H 63/30* (2006.01)

(56) References Cited

U.S. PATENT DOCUMENTS

| | | | | |
|---|---|---|---|---|
| 5,802,917 | A * | 9/1998 | Gondeck | 74/411.5 |
| 6,810,762 | B2 * | 11/2004 | Suzuki | 74/473.3 |
| 7,225,700 | B2 * | 6/2007 | Beer et al. | 74/473.37 |
| 7,353,726 | B2 * | 4/2008 | Beer et al. | 74/340 |
| 7,509,885 | B2 * | 3/2009 | Gerlofs et al. | 74/335 |
| 2001/0037698 | A1 | 11/2001 | Yamamoto et al. | |
| 2002/0189388 | A1 | 12/2002 | Suzuki | |
| 2004/0154419 | A1 * | 8/2004 | Harries et al. | 74/335 |
| 2006/0150761 | A1 | 7/2006 | Beer et al. | |
| 2008/0302199 | A1 * | 12/2008 | Shintani et al. | 74/473.12 |
| 2009/0038423 | A1 | 2/2009 | Shintani | |
| 2012/0090421 | A1 * | 4/2012 | Hagberg | 74/473.12 |

FOREIGN PATENT DOCUMENTS

| | | |
|---|---|---|
| DE | 10108881 A1 | 9/2002 |
| DE | 102006017265 A1 | 10/2006 |
| DE | 102005058406 A1 | 6/2007 |
| DE | 102006054611 A1 * | 5/2008 ............ F16H 61/32 |
| EP | 1044554 A3 * | 9/1984 |
| EP | 0 144 554 A2 | 6/1985 |
| EP | 2 028 396 A2 | 2/2009 |
| FR | 2860567 A1 | 4/2005 |
| FR | 2863028 A1 | 6/2005 |
| JP | S51-27767 U | 2/1976 |
| JP | S61-65528 | 5/1986 |
| JP | S63-080356 | 5/1988 |
| JP | 2002-089707 | 3/2002 |
| JP | 2002-372147 | 12/2002 |
| WO | WO 2007/099155 A1 | 9/2007 |

OTHER PUBLICATIONS

Japanese Office Action, dated Jul. 9, 2013, issued in corresponding Japanese Patent Application No. 2012-516033. English translation. Total 3 pages.

Supplementary European Search Report, dated Oct. 15, 2012, issued in corresponding European Application No. EP10789821. English translation. Total 6 pages.

International Search Report dated Aug. 26, 2010, issued in corresponding international application No. PCT/SE2010/050664.

* cited by examiner

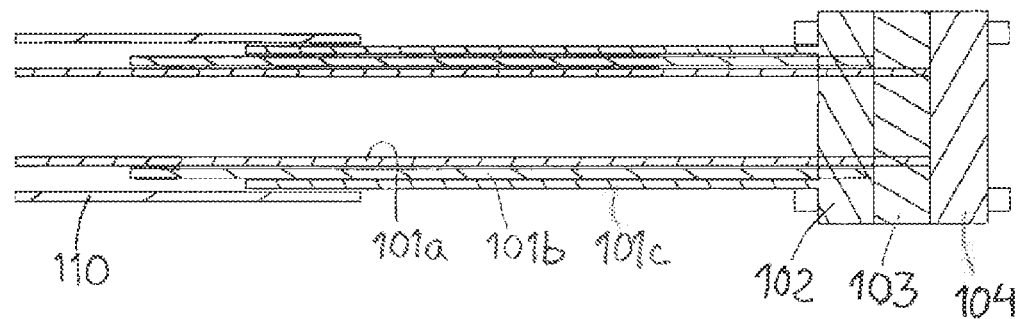
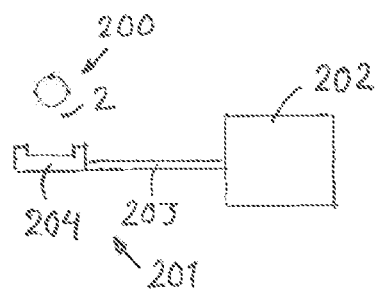
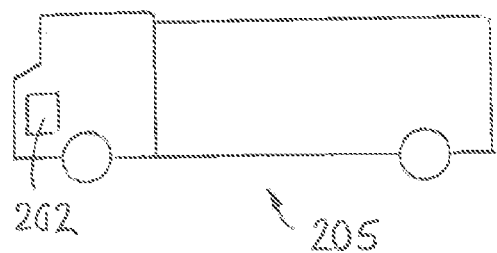

DEVICE FOR THE AUTOMATIC OPERATION OF A MANUAL GEAR BOX

CROSS-REFERENCE TO RELATED APPLICATIONS

The present application is a 35 U.S.C. §§371 national phase of PCT/SE2010/050664, filed Jun. 14, 2010, which claims priority of Swedish Application No. 0950469-7 filed Jun. 17, 2009, the contents of which are incorporated by reference herein. The Pct International Application was published in the English language.

FIELD OF THE INVENTION

The present invention relates to an operating device for an automatically switched manual gearbox, said gearbox being provided with a movable engagement element for each gear and said operating device being provided with rotary shafts and pivotable shift finger means for movement of selected engagement elements.

BACKGROUND TO THE INVENTION

A commonly occurring configuration in automatically switched manual gearboxes is that respective gears are engaged or disengaged by moving an engagement element, usually in the form of a shaft. The engagement element has a notch or yoke-like shoulder acted upon by a shift finger which engages in the notch and pushes the engagement element in the respective direction for engagement or disengagement of the gear.

The shift finger effects this movement by being pivoted about a rotary shaft. This entails the shift finger and the pivoting operating shaft being first moved axially so that the shift finger is located axially to the position for cooperation with the respective engagement shaft.

The axial movement of the rotary shaft with the shift finger involves the application of a relatively large force, normally by use of pneumatic or hydraulic power means. Gear changing therefore tends to be cumbersome and imprecise.

Gearboxes of this kind are described inter alia in US 20040154419, US 20020189388, US 2001037698 and FR 2860567.

US20040154419A1 describes a mechanism for gearbox operation whereby a solenoid or an electric motor pivots a shaft and a pulling solenoid which can turn away the shift fingers, two or more fingers in a package, depending on which gear is to be engaged in the gearbox. The turning away is to prevent any double gear change, i.e. simultaneous engagement of two selector shafts. The turning away takes place axially along the selector shaft which transmits a pivoting movement and an axial movement.

US20020189388A1 is a gear change mechanism based entirely on solenoids and only one shift finger and using solenoids to switch the shift finger to seven different positions. There are three solenoids to effect this switching.

US2001037698 describes a shift finger which is pivoted by solenoids.

FR 2860567 describes a number of shift fingers which can be engaged individually relative to one another, with a slide which prevents an incorrect gear from being engaged when the others are to be operated, a kind of locking slide.

The object of the present invention is to propose an operating device of the kind here concerned whereby the disadvantages described above are eliminated, which device thus makes it possible for engagement and disengagement of a gear to take place more smoothly and simply than is possible in the state of the art.

SUMMARY OF THE INVENTION

The object stated is achieved according to the invention by an operating device of the kind indicated in the introduction having the special features that the shift finger means comprises a number of separate shift fingers, each of them is associated with a specific engagement element and adapted to being separately pivotable independently of the other shift fingers.

Separate and independent operation of each shift finger eliminates the need to move any shift fingers axially in relation to engaging or disengaging a gear. In principle, the shift fingers and also the rotary shaft may thus be so arranged that they are not movable axially. This makes the gearbox easier to operate and results in greater precision. The force to be applied becomes smaller and the force required in the axial direction of the rotary shaft is reduced significantly or eliminated. The power equipment can therefore be simplified and configured without pneumatic means. Eliminating the need to be able to move the shift fingers axially also renders the configuration of the operating device simpler than known similar devices.

According to a preferred embodiment, the shift fingers are fitted axially after one another along a rotary shaft which is movable axially to assume various operating positions, in each of which the rotary shaft is connected to, for joint rotation with, only one of the shift fingers and is pivotable relative to the other shift fingers.

This version provides a very simple solution for effecting the pivoting movement in that the same shaft is used for operating all of the shift fingers. It also eliminates the need to effect axial movement of any part of the operating device.

According to a further preferred embodiment, the rotary shaft extends through a hole in each shift finger, each hole having at least one groove running axially through it, and the rotary shaft is provided with at least one radial protrusion for pivoting cooperation with respective grooves in at least one of the shift fingers depending on the operating position of the rotary shaft.

The result is the establishment of a spline-like connection between the rotary shaft and the respective shift finger and hence effective and reliable transmission of the pivoting movement. Movement of the rotary shaft is a simple way of putting its protrusions into pivoting cooperation with the shift finger which is related to an intended gear.

According to a further preferred embodiment, each shift finger is provided with an indexing element which is urged towards the rotary shaft by a respective spring, and the rotary shaft is provided with a hollow adapted to being able to accommodate any of the indexing elements.

The indexing element facilitates the axial positioning of the rotary shaft so that it reaches correct positions for pivoting of intended shift fingers. When the hollow is moved axially to position for one of the indexing elements, the spring will snap the indexing element into the hollow, thereby indicating correct axial position relative to the shift finger for effecting pivoting for gear change. Upon axial movement from this position in order to engage another gear, the indexing element is pushed up out of the notch against the action of the spring and abuts against the periphery of the rotary shaft.

With advantage, the indexing element takes the form of a ball or is of spherical configuration on at least its side which faces towards the rotary shaft, and the hollow is of corresponding spherical shape. The snapping in and pushing out of the indexing element are thus facilitated.

According to a further preferred embodiment, the shift fingers are fitted axially after one another along a rotary shaft package which comprises a number of coaxial rotary shafts which are pivotable relative to one another and are each connected to, for joint rotation with, a particular shift finger.

This alternative embodiment eliminates the need to provide a locking mechanism for firm locking of the respective shift fingers, which in this respect represents a simplification. Gear selection is effected by pivoting a selected one of the rotary shafts.

According to a further preferred embodiment, each rotary shaft is provided with a radially protruding pivot element connected to, for joint rotation with, the rotary shaft, and these pivot elements are located axially after one another along the rotary shaft package.

The pivot elements facilitate pivoting of the respective rotary shafts. The fact that they are axially separate also makes it easy to pivot only one of the rotary shafts. With advantage, each pivot element takes the form of a radial pin.

According to a further preferred embodiment, the device comprises a slide which is movable axially, pivotable on the rotary shaft package and provided with shoulder elements adapted to pivoting action upon selected pivot elements according to the axial position of the slide.

The slide and the pivot elements constitute a simple, robust and reliable mechanism for engagement of gears. Gear selection is by moving the slide so that its shoulder elements come into position to act upon respective pivot elements. Relevant shift fingers can thereafter easily be pivoted via their associated rotary shafts by pivoting the slide.

According to a further preferred embodiment, the slide takes the form of a cut cylinder supported on the outermost of the rotary shafts and has an opening running axially which comprises a first section with a smaller peripheral width and at least one second section with a larger peripheral width, smaller and larger peripheral width being defined by the difference in angular extent being at least twice as great as the angular movement of a shift finger which is required to engage or disengage a gear.

The shoulder elements of a slide thus configured will be of very simple construction since the edges of the smaller section of the opening will themselves serve as shoulder elements. The greater width of the remainder of the opening makes it possible for the pivoting of the slide to take place without affecting the pivot elements of any of the other rotary shafts.

According to a further preferred embodiment, the opening comprises two sections with the larger width, each situated axially on its respective side of the section with the smaller width.

The maximum axial movement of the slide required to engage a gear is thus minimised.

According to a further preferred embodiment, the smaller width corresponds to an angle within the range 5-10° and the larger width to an angle within the range 120-175°.

The relative definition of smaller and larger width indicated above is normally fulfilled within this angle range. The smaller width has to be at least as large as the peripheral extent of each pivot element, with a certain tolerance to avoid disruption of axial relative movement between pivot element and slide. The range indicated is advantageous in this respect. A larger width within the range indicated will then result in a good margin as regards space for gear change movement in either direction. The fact that the larger width is less than 180° provides assurance of the slide's centering about the rotary shaft package.

According to a further preferred embodiment, the operating device comprises a solenoid or an electric motor adapted to pivoting the rotary shaft/one of the rotary shafts.

The operating device invented makes it possible for only a relatively small amount of force to have to be applied to engage or disengage a gear. This embodiment takes advantage of the possibility of dispensing with pneumatic or hydraulic operation. The device thereby becomes particularly simple and reliable.

The invention relates also to a gearbox provided with an operating device in accordance with the invention, particularly according to any of its preferred embodiments.

The invention further relates to a motor vehicle provided with the invented gearbox.

The invented gearbox and the invented motor vehicle afford advantages of similar kinds to the invented operating device and its preferred embodiments, which advantages are described above.

Advantageous embodiments are indicated above. It should be noted that further preferred embodiments may of course take the form of all conceivable combinations of the preferred embodiments indicated above.

The invention is further explained by the detailed description set out below of some examples of an operating device according to the invention, with reference to the accompanying drawings.

BRIEF DESCRIPTION OF THE DRAWINGS

FIG. 7 is a longitudinal section through a detail of the operating device in FIG. 4.

FIG. 8 illustrates schematically a gearbox with operating device according to the invention.

FIG. 9 illustrates schematically a vehicle provided with a gearbox according to FIG. 8.

DESCRIPTION OF THE EMBODIMENT EXAMPLES

Figure 1:
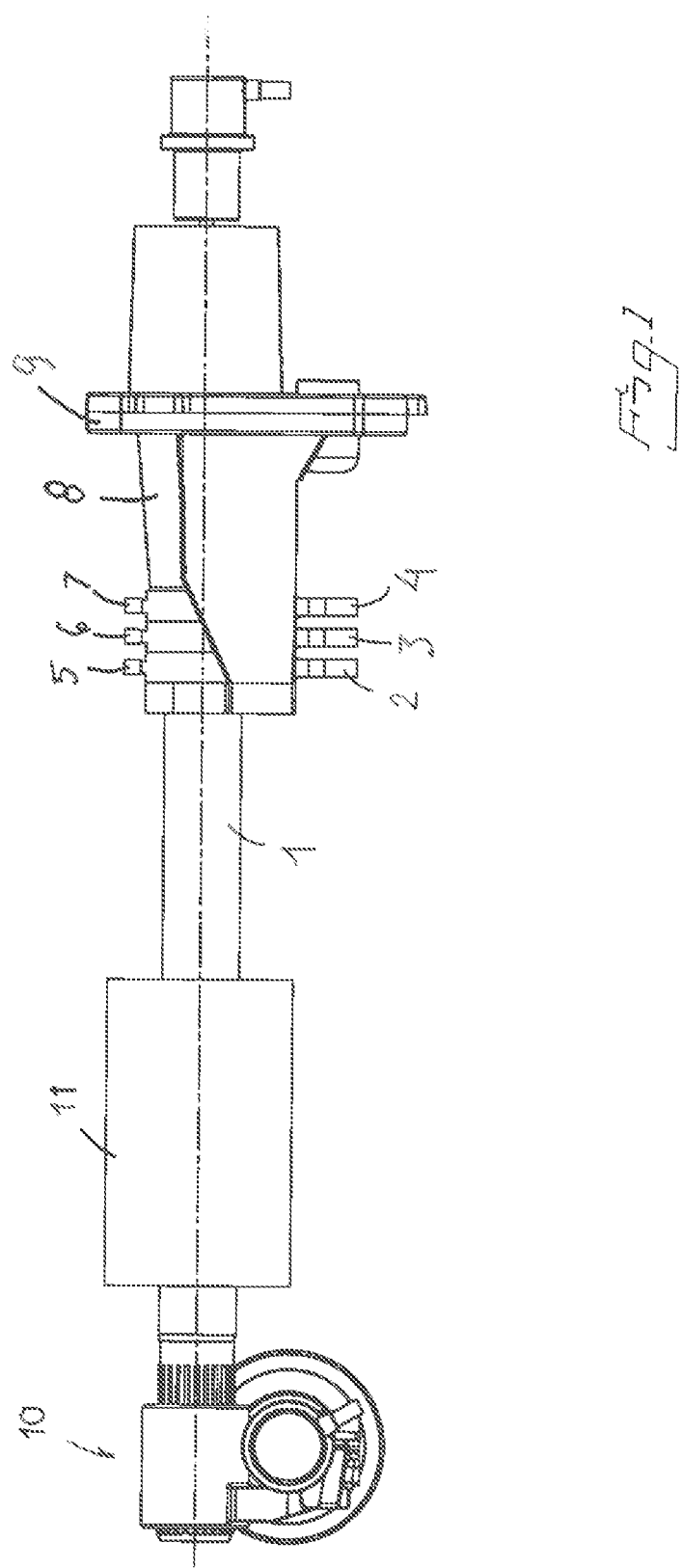
FIG. 1 is a side view of an operating device according to a first embodiment example of the invention.

FIG. 1 depicts an operating device according to the invention in a side view in which a rotary shaft 1 is provided with a number of, in this example three, shift fingers 2, 3, 4. Each of the shift fingers is adapted to being connectable to, for joint rotation with, the rotary shaft 1 by means of a spline-like connection. When one of the shift fingers is connected firmly to, for joint rotation with, the rotary shaft 1, the other two are free-running. Pivoting of the rotary shaft 1 therefore causes whichever of shift fingers 2, 3, 4 is connected for joint rotation to pivot, whereupon its portion which protrudes downwards in the diagram will move out perpendicular to the plane of the paper. The other two shift fingers will be stationary. The pivoted shift finger is connected to an undepicted engagement shaft running perpendicular to the plane of the paper and moves the engagement shaft to engage or disengage one of the gears in an undepicted gearbox. The rotary shaft 1 is journalled at its right end in FIG. 1 in a bearing housing 8 supported by a bearing bracket 9.

Reference numeral 11 denotes a drive unit for axial movement of the rotary shaft 1. The drive unit 11 is with advantage a solenoid or an electric motor. Reference numeral 10 symbolises the drive mechanism for rotating the rotary shaft.

Figure 2:
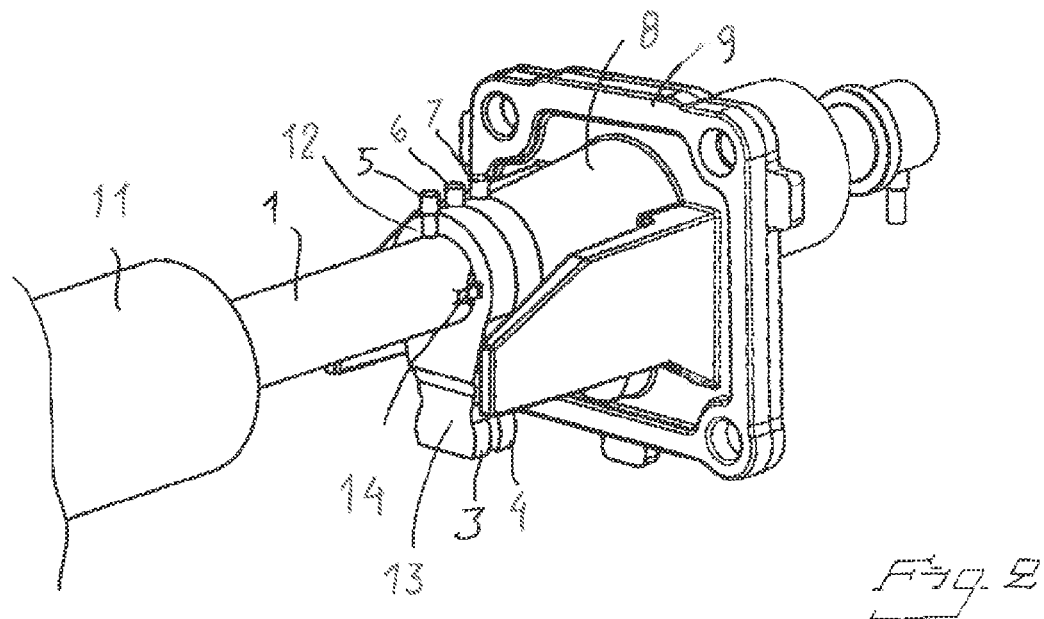
FIG. 2 is a perspective view of part of the operating device in FIG. 1.

FIG. 2 depicts the right portion of FIG. 1 in a perspective view with one of the shift fingers removed to make certain details clearer. Each shift finger 3, 4 comprises a circular portion 12 surrounding the rotary shaft 1 and a finger portion 13 which protrudes from the circular portion 12 and is flat-shaped. Each shift finger has in its circular portion a radial hole which accommodates a respective indexing mechanism 5, 6, 7 described in more detail in relation to FIG. 3. The rotary shaft 1 has two protrusions 14, only one of which is visible in FIG. 2, the other being situated on the diametrically opposite side. Each protrusion 14 takes the form of a ridge 14 running axially with an axial extent which is somewhat smaller than the thickness of a shift finger.

Figure 3:
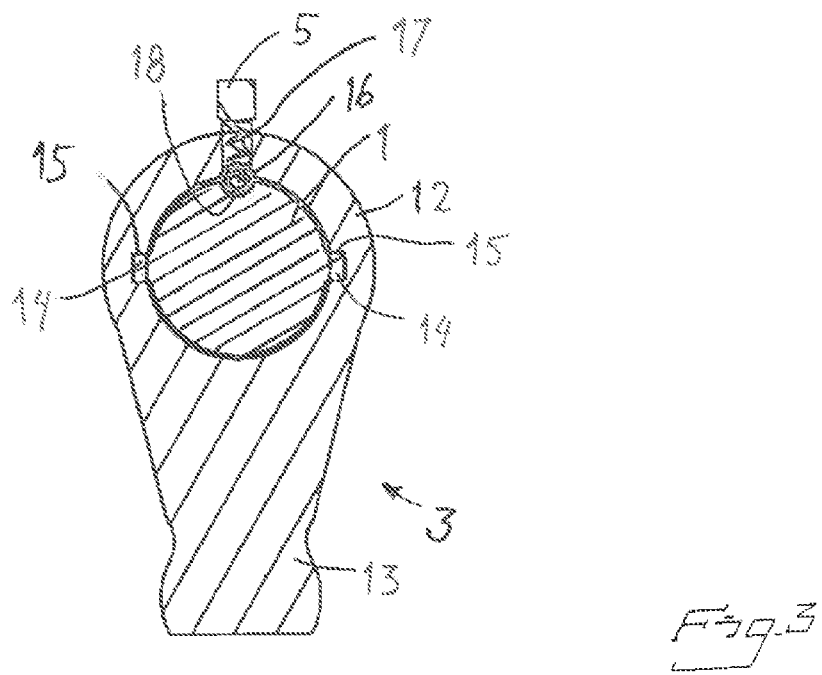
FIG. 3 is a section through a detail of the operating device in FIG. 2.
Figure 4:
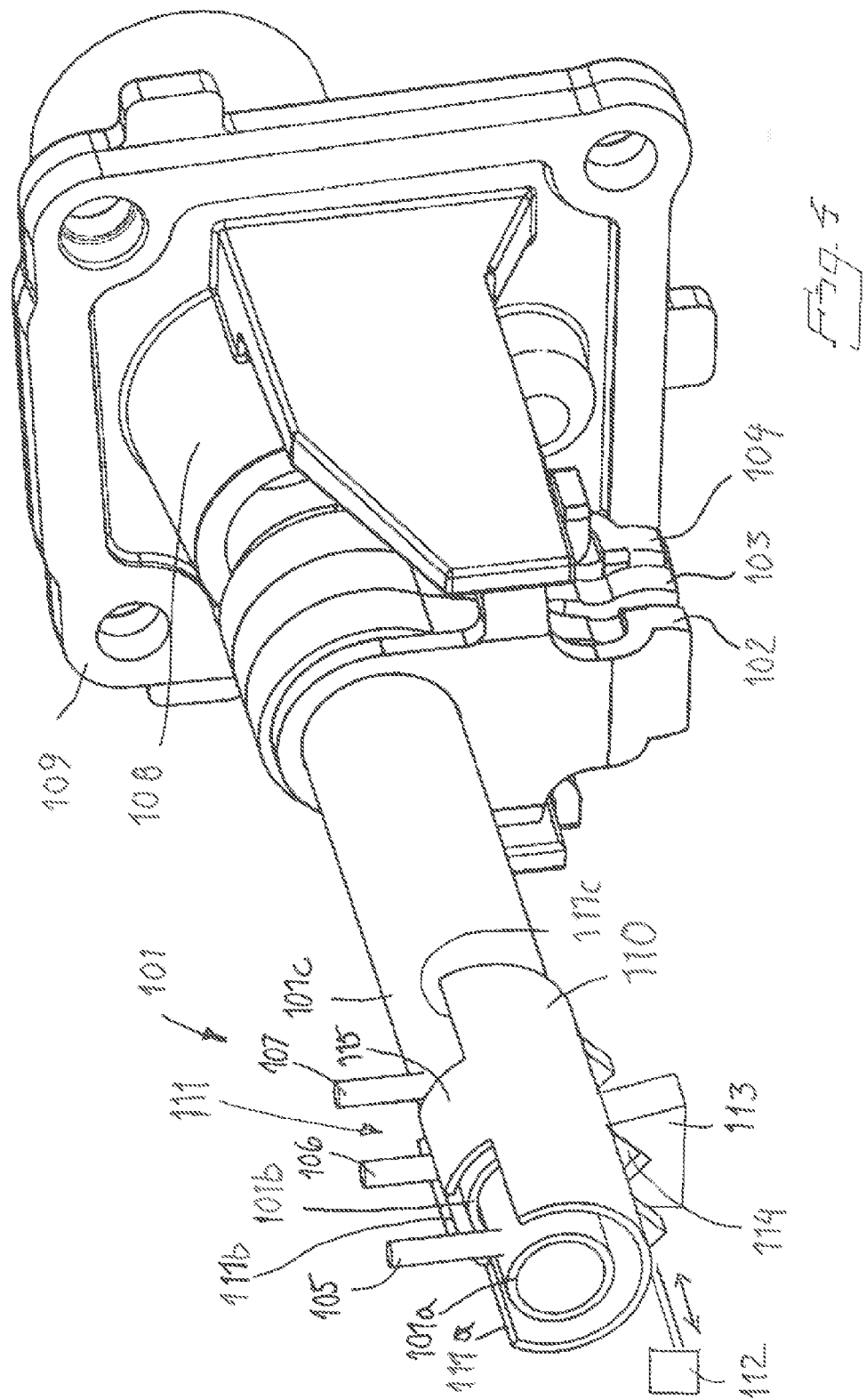
FIG. 4 is a perspective view of an operating device according to a second embodiment example.
Figure 5:
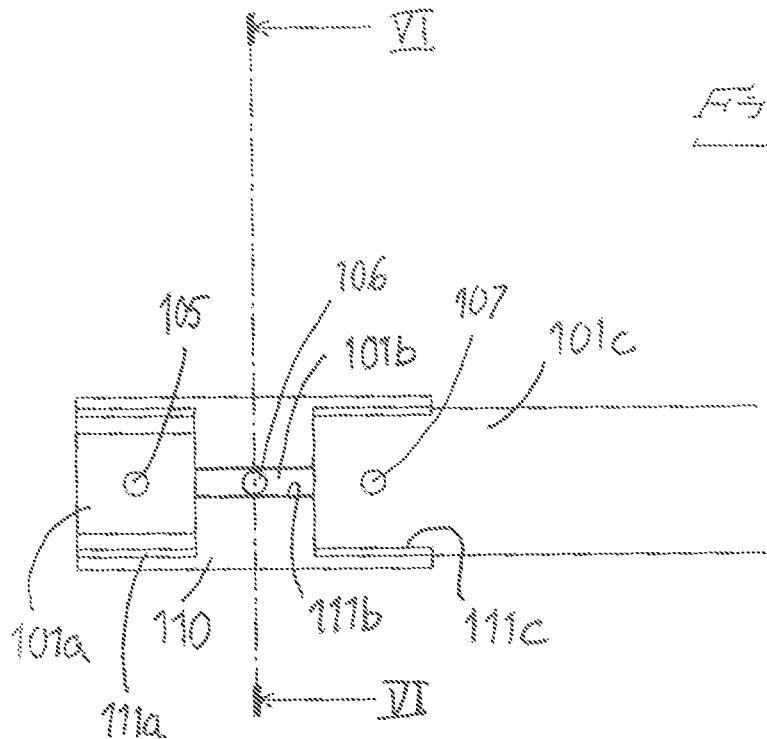
FIG. 5 is a view from above of a detail of the operating device in FIG. 4.
Figure 6:
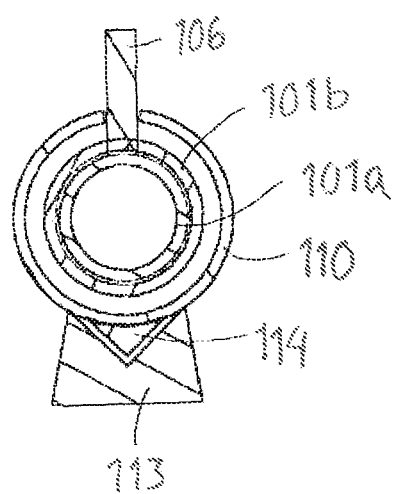
FIG. 6 is a section along the line VI-VI in FIG. 5.

FIG. 3 depicts the middle shift finger 3 in a section transverse to the axial direction, the shift finger 3 being axially positioned centrally to the rotary shaft's protrusions 14. The shift finger 3 has two grooves 15 disposed diametrically and shaped to complement the protrusions 14. A spline-like connection is thus established between the rotary shaft 1 and the shift finger 3 which is positioned axially with its grooves 15 cooperating with the protrusions 14.

The indexing mechanism 5 comprises a spring 17 which urges an indexing element 16 in the form of a ball 16 towards the rotary shaft. The rotary shaft 1 is provided with a spherical hollow 18 adapted to being able to accommodate the ball 16. In the position depicted, the ball 16 is pressed into the hollow 18. The rotary shaft's hollow 18 is axially situated centrally to the shaft's protrusions 14.

Gear changing takes place as follows with reference to FIGS. 2 and 3. In a neutral state, the shift fingers 2, 3, 4 are situated centrally to one another so that their respective grooves 15 form a composite groove. In this state, the rotary shaft 1 is so positioned that its protrusions 14 are situated centrally to the grooves 15 of the shift fingers. The hollow 18 of the rotary shaft 1 is also axially situated centrally to the ball 16 of one of the shift fingers, with advantage the middle shift finger 3.

If the gear which is engaged by means of the shift finger 4 is to be activated, the rotary shaft is moved axially to the right in FIG. 2. This results in the ball 16 of the shift finger 3 being pushed out from the hollow 18 and sliding axially on the periphery of the rotary shaft. When the axial movement has caused the hollow 18 to reach the shift finger 4 on the right in the diagram, the latter's ball snaps into the hollow 18 and a distinct axial position thus becomes indexed. During the movement, the protrusions 14 of the rotary shaft move to engage in the corresponding notches of the right shift finger 4.

In this position, the rotary shaft 1 pivots, resulting in the spline-like connection 14, 15 causing the shift finger 4 to pivot and act upon the undepicted engagement shaft. The pivoting movement causes the ball of the indexing mechanism 7 of the shift finger 4 to be pushed outwards and to slide in the peripheral direction on the rotary shaft 1.

In the example depicted, the rotary shaft has only one hollow 18 for the ball lock. Alternatively, the number of hollows may be the same as the number of shift fingers so that in a neutral state each ball 16 is pushed into a respective hollow. The hollow or hollows 18 may alternatively take the form of a groove of circular profile which runs in a circumferential direction.

Another example of an operating device according to the invention is illustrated in FIGS. 4-7. In this case a rotary shaft package 101 is adapted to operating the shift fingers 102, 103, 104. The rotary shaft package 101 is comprised of three coaxial rotary shafts 101a, 101b, 101c each connected to, for joint rotation with, the respective one of the shift fingers 102, 103, 104. The two outer rotary shafts 101b, 101c are therefore hollow shafts, while the inner rotary shaft 101a may alternatively be solid.

The rotary shafts are each provided at their left end in the diagram with respective radially protruding pins 105, 106, 107 which in a neutral state are all in the same axial plane. The inner driveshaft 101a extends somewhat further out to the left than the middle driveshaft 101b, which itself extends somewhat further out than the outermost driveshaft 101c. The purpose of this is to provide space for the pins 105, 106 on the two inner shafts. A slide 110 for effecting the pivoting movement of the rotary shafts is provided in the region of their pins. The rotary shaft package 101 is journalled at its right end in the diagram in a bearing housing 108 supported by a bearing bracket 109 in a similar way to the first example.

The slide 110 is of generally cylindrical shape with an inside diameter corresponding to the outside diameter of the outer rotary shaft 101c and is journalled on the latter in such a way that it can be moved axially and pivoted. An opening 111 running axially extends along the whole length of the slide 110.

The opening is of varying width and divided into three sections 111a, 111b, 111c each running one-third of the length of the slide 110. A section 111a of relatively large width corresponding to an angle of barely half a turn is situated at one end of the slide 110. A further section 111c of the same width is situated at the other end of the slide 110. There is between them, in the axial central region of the slide, a section 111b of considerably smaller width than the first and second sections. The width of the middle section 111b corresponds to an angle of about 10°.

The middle section takes the form of a tongue 115 extending out from each side of the edges of the opening which constitute the wider sections 111a, 111c. The third section 111b is situated symmetrically relative to the other two.

Engaging and disengaging a gear is effected by moving the slide 110 axially along the rotary shaft package 101 so that the section 111b with the smallest width becomes axially central to whichever of the pins 105, 106, 107 is associated with the gear which is to be engaged. Thereafter the slide 110 is pivoted, whereupon one edge of the smallest-width section 111b is pressed against the respective pin, which in the diagram is the middle pin 106, and causes it to pivot with it. The result is pivoting of the rotary shaft 101b to which the pin 106 is fastened and hence of the shift finger 103 fastened to the rotary shaft. The shift finger 103 then moves in a conventional way the associated engagement shaft (not depicted).

When the slide 110 pivots to maneuver the pin 106, the other two pins 105, 107 will not be affected, since the sections 111a, 111c of the opening which are situated axially to them are of considerably greater width. The respective edges of these sections will not reach the respective pin during the pivoting movement, since the angular distance between an edge of the smallest-width section 111b and the corresponding edges of the other two sections 111a, 111c is greater than the required movement angle.

It may be appreciated that the smallest-width section need not necessarily be situated axially at the middle of the slide. It may alternatively be at one end of the slide, in which case the other two sections will form a composite larger-width section.

Reference numeral 112 symbolises a control means for the axial movement of the slide 110, and reference numeral 113 a control means for the slide's pivoting via one of the pivot lugs 114 provided on the slide. Although these control means may themselves comprise conventional pneumatics or hydraulics, the operating device according to the invention makes it possible to use for this purpose simpler and less expensive means such as solenoids or electric motors. With advantage, the operating device is therefore of this kind.

FIG. 7 shows the respective rotary shafts 101a, 101b, 101c each extending to the respective associated operating fingers 102, 103, 104, to which they are connected for joint rotation with them. The diagram also shows the slide 110 placed on the outside of the shaft package at the latter's left end in the diagram.

FIG. 8 illustrates schematically a gearbox 202 provided with an operating device 200 according to the invention, whereby the gear change movement is transmitted in a conventional way via an engagement element 201 with engagement shaft 203 and switching yoke 204.

FIG. 9 illustrates a vehicle 205 provided with a gearbox 202 according to the invention.

The invention claimed is:

1. An operating device for an automatically switched manual gearbox with a plurality of gears, wherein
    the gearbox includes a respective movable engagement element for selectively engaging and disengaging from each gear of the gearbox,
    the operating device comprises a single rotary shaft and a respective rotatable shift finger,
    each respective rotatable shift finger is configured to move a selected one of the engagement elements,
    each respective rotatable shift finger is separately pivotable independently of the other shift fingers, the shift fingers being fitted axially after one another along the single rotary shaft,
    the single rotary shaft is movable axially to various operating positions,
    each operating position is selected such that the single rotary shaft is connected for joint rotation with the respective rotatable shift finger and is pivotable relative to the other shift fingers,
    each shift finger has an indexing element,
    a respective spring urges the indexing element towards the single rotary shaft,
    at least one hollow in the single rotary shaft is configured to accommodate any of the indexing elements, and
    the single rotary shaft is configured to be indexed at each axial position corresponding to a respective shift finger whose indexing element is accommodated in a hollow of the at least one hollow in the single rotary shaft, wherein each shift finger surrounds a respective hole with at least one groove, the single rotary shaft extending through the respective hole, the at least one groove running through each shift finger axially, and the single rotary shaft has at least one radial protrusion for pivoting cooperation with a respective at least one groove in at least one of the shift fingers, a position of the respective at least one groove depending on the operating position of the single rotary shaft.

2. The operating device according to claim 1, wherein the operating device comprises a solenoid or an electric motor configured and positioned to turn the single rotary shaft.

3. The automatically switched manual gearbox provided with the operating device according to claim 1.

4. A motor vehicle provided with the gearbox according to claim 3.

5. An operating device for an automatically switched manual gearbox with a plurality of gears, wherein
    the gearbox includes a respective movable engagement element for selectively engaging and disengaging from each gear of the gearbox,
    the operating device comprises a single rotary shaft and a respective rotatable shift finger,
    each respective rotatable shift finger is configured to move a selected one of the engagement elements,
    each respective rotatable shift finger is separately pivotable independently of the other shift fingers, the shift fingers being fitted axially after one another along the single rotary shaft,
    the single rotary shaft is movable axially to various operating positions,
    each operating position is selected such that the single rotary shaft is connected for joint rotation with the respective rotatable shift finger and is pivotable relative to the other shift fingers,
    each shift finger surrounds a respective hole with at least two grooves, the single rotary shaft extending through the respective hole, the at least two grooves running through each shift finger axially,
    the single rotary shaft has at least two radial protrusions, at least one radial protrusion being configured for pivoting cooperation with a respective at least one groove in at least one of the shift fingers, a position of the respective at least one groove depending on the operating position of the single rotary shaft, and
    each shift finger has an indexing element, the indexing element being located centrally with respect to the at least two radial protrusions.

\* \* \* \* \*